(12) United States Patent
Nukaya et al.

(10) Patent No.: US 10,640,073 B2
(45) Date of Patent: May 5, 2020

(54) AIRBAG APPARATUS

(71) Applicant: TOYODA GOSEI CO., LTD., Kiyosu-shi, Aichi-ken (JP)

(72) Inventors: Akihiro Nukaya, Kiyosu (JP); Kensaku Honda, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 157 days.

(21) Appl. No.: 15/879,587

(22) Filed: Jan. 25, 2018

(65) Prior Publication Data

US 2018/0222434 A1 Aug. 9, 2018

(30) Foreign Application Priority Data

Feb. 6, 2017 (JP) ................................. 2017-019319

(51) Int. Cl.
*B60R 21/16* (2006.01)
*B60R 21/231* (2011.01)
(Continued)

(52) U.S. Cl.
CPC ...... *B60R 21/23138* (2013.01); *B60R 21/207* (2013.01); *B60R 21/233* (2013.01);
(Continued)

(58) Field of Classification Search
CPC .......... B60R 21/23138; B60R 21/272; B60R 21/207; B60R 21/233; B60R 2021/2314;
(Continued)

(56) References Cited

U.S. PATENT DOCUMENTS 7,600,777 B2 * 10/2009 Suzuki ................. B60R 21/231
280/730.2
7,837,226 B2 * 11/2010 Honda ............. B60R 21/23138
280/730.2
(Continued)

FOREIGN PATENT DOCUMENTS

EP         3511208 A1    7/2019
JP       2015-13500 A    1/2015
(Continued)

OTHER PUBLICATIONS

Office Action dated Feb. 18, 2020 issued in corresponding JP patent application No. 2017-019319 (and English translation).

*Primary Examiner* — Toan C To
(74) *Attorney, Agent, or Firm* — Posz Law Group, PLC

(57) ABSTRACT

An airbag apparatus includes a gas generator, and an airbag. The airbag includes a first fabric inner tube and a second fabric inner tube, both surrounding at least a gas injecting portion of the gas generator to have a double tubular shape. Common portions of the first inner tube and the second inner tube in a tubular circumferential direction are coupled to an airbag main body by a coupling portion extending in a tubular length direction, and other common portions which are separated from the common portions of the first inner tube and the second inner tube by a central angle (a central angle in a state where the airbag is only deployed and not inflated) of 70 to 180 degrees about the gas generator in the tubular circumferential direction are coupled to each other by a coupling portion extending in the tubular length direction.

16 Claims, 7 Drawing Sheets

(51) Int. Cl.
  *B60R 21/233* (2006.01)
  *B60R 21/207* (2006.01)
  *B60R 21/272* (2006.01)
  *B60R 21/237* (2006.01)

(52) U.S. Cl.
  CPC .......... *B60R 21/272* (2013.01); *B60R 21/237* (2013.01); *B60R 2021/23146* (2013.01); *B60R 2021/23324* (2013.01); *B60R 2021/23332* (2013.01)

(58) Field of Classification Search
  CPC ........ B60R 2021/23324; B60R 21/237; B60R 2021/23332
  USPC ......... 280/729, 730.2, 740, 741, 742, 743.1, 280/743.2
  See application file for complete search history.

(56) References Cited

U.S. PATENT DOCUMENTS

| | | | | |
|---|---|---|---|---|
| 9,545,893 | B2* | 1/2017 | Fujiwara | B60R 21/207 |
| 2002/0038949 | A1* | 4/2002 | Okada | B60R 21/233 |
| | | | | 280/743.2 |
| 2006/0038386 | A1* | 2/2006 | Shibayama | B60R 21/23138 |
| | | | | 280/730.2 |
| 2007/0228701 | A1* | 10/2007 | Yamamura | B60R 21/23138 |
| | | | | 280/730.2 |
| 2009/0045606 | A1* | 2/2009 | Yoshikawa | B60N 2/42763 |
| | | | | 280/728.2 |
| 2015/0076803 | A1* | 3/2015 | Fujiwara | B60R 21/207 |
| | | | | 280/730.2 |
| 2015/0115583 | A1* | 4/2015 | Azuma | B60R 21/231 |
| | | | | 280/740 |
| 2015/0166003 | A1* | 6/2015 | Fujiwara | B60R 21/207 |
| | | | | 280/730.2 |
| 2015/0367806 | A1* | 12/2015 | Fujiwara | B60R 21/233 |
| | | | | 280/729 |
| 2016/0159313 | A1 | 6/2016 | Fujiwara | |
| 2016/0368449 | A1 | 12/2016 | Fujiwara | |
| 2017/0008481 | A1 | 1/2017 | Hotta et al. | |

FOREIGN PATENT DOCUMENTS

| | | |
|---|---|---|
| JP | 2015-30322 A | 2/2015 |
| JP | 2015-104973 A | 6/2015 |
| JP | 2017-013746 A | 1/2017 |
| WO | 2018/047617 A1 | 3/2018 |

* cited by examiner

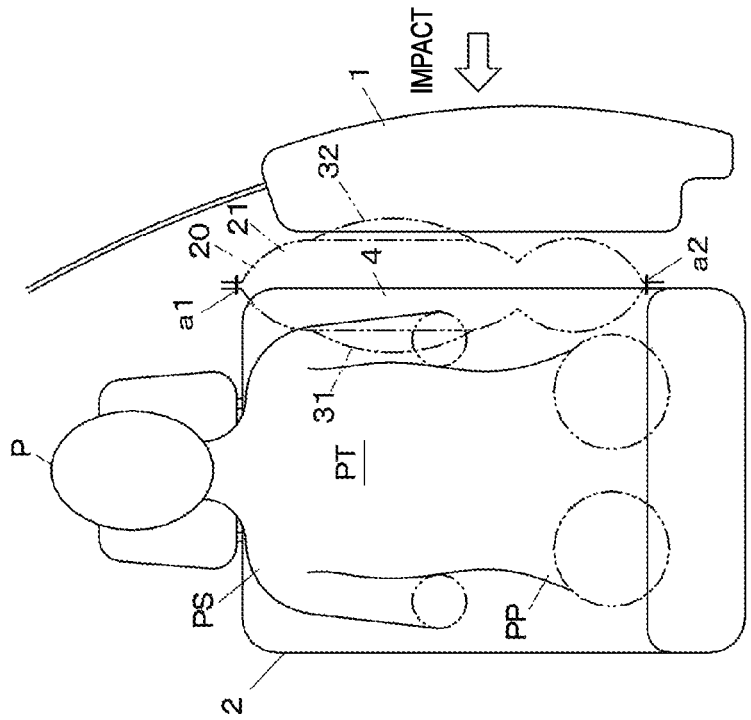
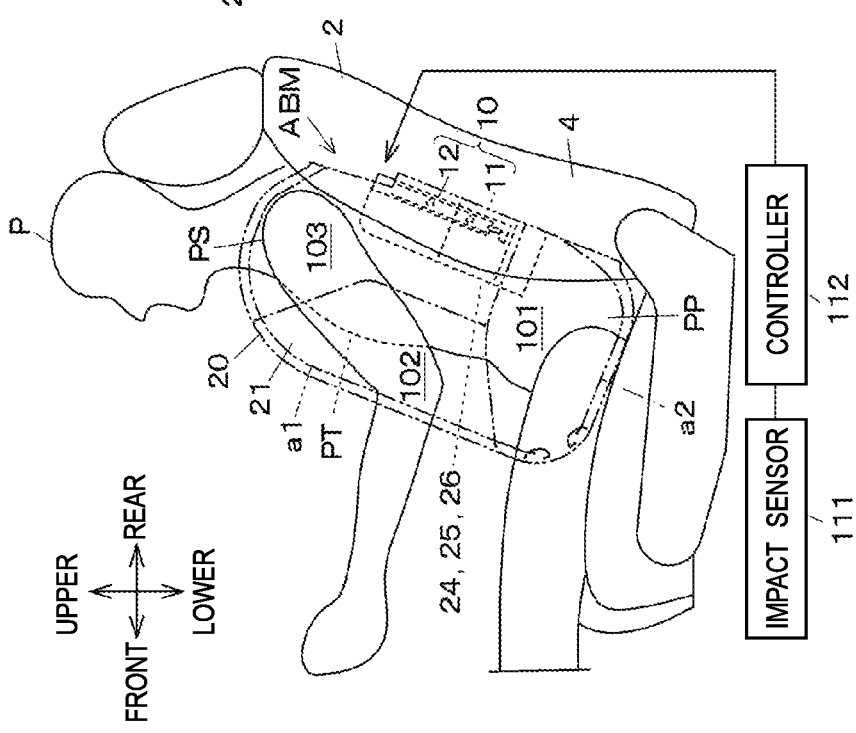
FIG.1A
FIG.1B

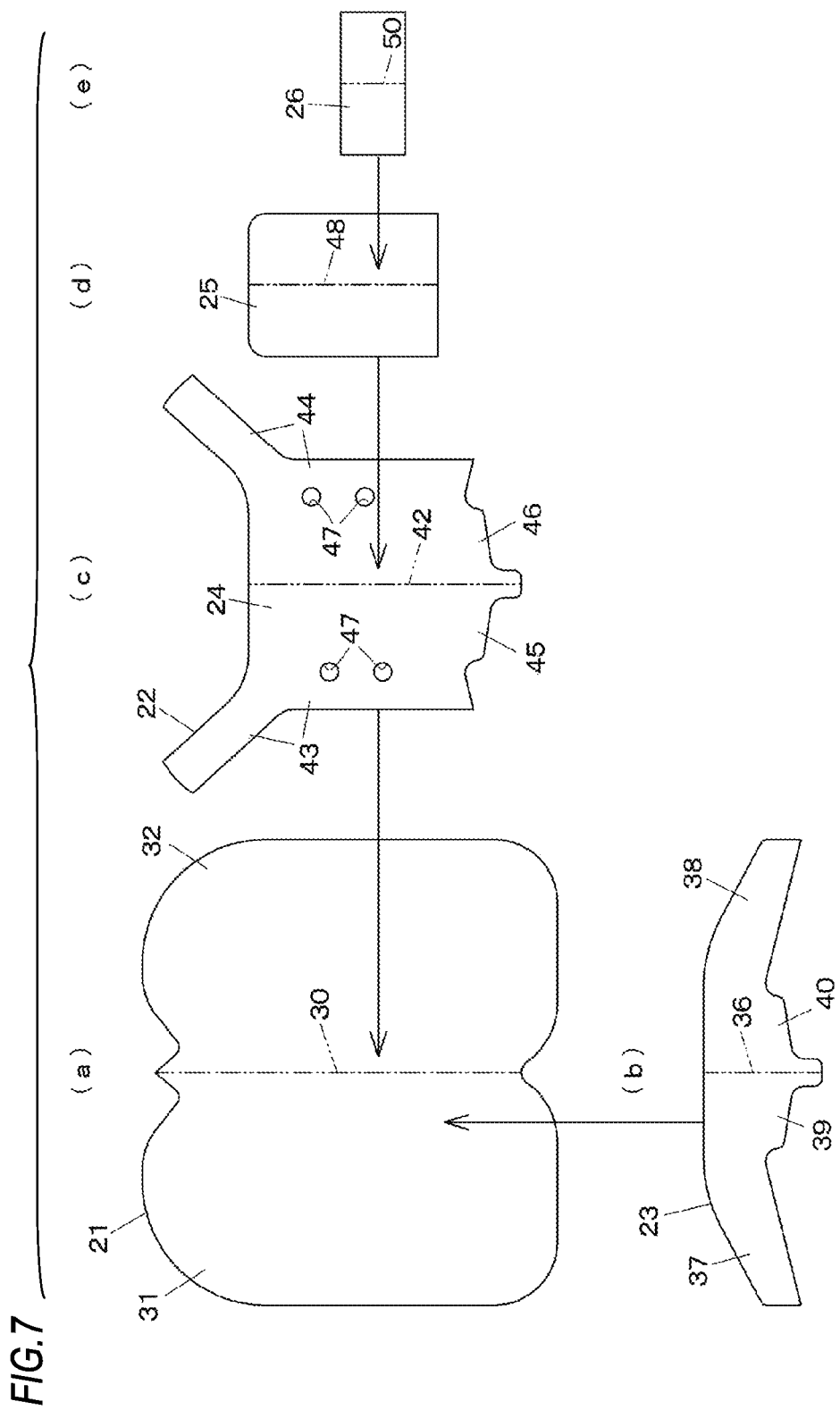

AIRBAG APPARATUS

CROSS-REFERENCE TO RELATED APPLICATION(S)

This application is based upon and claims the benefit of priority from Japanese Patent Application No. 2017-019319, filed on Feb. 6, 2017, the entire contents of which are incorporated herein by reference.

BACKGROUND

1. Field of the Invention

The present invention relates to an airbag apparatus which is configured to deploy and inflate an airbag to protect an occupant when impact is applied to a vehicle, and particularly, to a side airbag apparatus which is configured to deploy and inflate an airbag at a side of an occupant.

2. Description of the Related Art

An airbag apparatus includes a gas generator and a fabric (cloth) airbag. A fabric tubular inner tube (also referred to as "rectification part") is often provided at an airbag portion which corresponds to a gas injecting portion of the gas generator in order to protect the airbag from high-temperature gas and to rectify the high-temperature gas.

In recent years, in a side airbag apparatus, an inflation space in an airbag is partitioned into a plurality of inflation chambers, and a check valve which communicates with the inner tube is provided in order to prevent escape of gas from one inflation chamber to another inflation chamber (for example, from a lower inflation chamber corresponding to a waist to an upper inflation chamber corresponding to a chest). The check valve is formed with a cloth to have a tubular shape with an opening and is configured such that the opening is closed when the cloth in the vicinity of the opening is subjected to a predetermined crush-deformation by gas backflow.

For example, a side airbag apparatus disclosed in JP-A-2015-30322 (in particular FIGS. 13 to 15) includes a fabric rectification part and is formed with a check valve at a lower portion of an upper-lower partition cloth which partitions an inflation space. However, since the rectification part is configured by one piece of cloth, there is a possibility that the rectification will not be stabilized while the rectification part is deformed by gas flow, and a protecting effect against high-temperature gas is not high enough. Further, since the check valve is also configured by only one piece of cloth, there is a possibility that the check valve will be deformed by gas backflow in a way different from a predetermined crush-deformation and will not close appropriately, which deteriorates backflow prevention effect.

In a side airbag apparatus disclosed in JP-A-2015-13500 (in particular FIGS. 11 and 12), a lower portion of a rectification cloth is inserted into an upper portion of a waist rectification cloth, a check valve is formed at an lower portion of an upper-lower partition cloth which partitions an inflation space, and a lower portion of the waist rectification cloth is inserted into the check valve. According to the above-described configuration in which the rectification cloth and the waist rectification cloth are used in combination, there is a possibility that a protecting effect against high-temperature gas is improved. However, since the rectification cloth and the waist rectification cloth are sewn into tubular shapes separately, and the rectification cloth and the waist rectification cloth are deformed separately without being constrained with each other, there is a possibility that the rectification will not be stabilized. Even though the lower portion of the waist rectification cloth is inserted into the check valve, there is still a possibility that the check valve will be deformed by gas backflow in a way different from a predetermined crush-deformation and will not close appropriately since the vicinity of an opening to be crush-deformed is configured by only one piece of cloth, so that a backflow prevention effect may deteriorate.

In a side airbag apparatus disclosed in JP-A-2015-104973 (in particular FIGS. 5 and 6), a lower portion of an inner tube is inserted into a lateral partition portion which partitions an inflation space, a check valve is formed at the lower portion of the inner tube, and another check valve is formed at a lower portion of the lateral partition portion. Since both check valves have a double inner and outer structure and rigidity thereof is increased, a predetermined crush-deformation will occur and the backflow prevention effect will be improved. However, since a portion through which high-temperature gas is injected from a gas generator is configured only by one piece of cloth of the inner tube, a protecting effect against the high-temperature gas is not high enough.

SUMMARY

In view of the above circumstances, an object of the present invention is to improve an effect of protecting an airbag from high-temperature gas and an effect of rectifying the high-temperature gas, particularly by an inner tube.

(1) According to a first aspect of the present invention, there is provided an airbag apparatus including a gas generator and an airbag, wherein the airbag includes a first fabric inner tube and a second fabric inner tube, both surrounding at least a gas injecting portion of the gas generator to have a double tubular shape from inside to outside in this order, wherein common portions of the first inner tube and the second inner tube in a tubular circumferential direction are coupled to an airbag main body by a coupling portion extending in a tubular length direction, and wherein other common portions which are separated from the common portions of the first inner tube and the second inner tube by a central angle (a central angle in a state where the airbag is only deployed and not inflated) of 70 to 180 degrees about the gas generator in the tubular circumferential direction are coupled to each other by a coupling portion extending in the tubular length direction.

(2) According to a second aspect of the present invention, there is provided an airbag apparatus including a gas generator and an airbag, wherein the airbag includes a second fabric inner tube and a third fabric inner tube, both surrounding at least a gas injecting portion of the gas generator to have a double tubular shape from inside to outside in this order, wherein common portions of the second inner tube and the third inner tube in a tubular circumferential direction are coupled to an airbag main body by a coupling portion extending in a tubular length direction, and wherein other common portions which are separated from the common portions of the second inner tube and the third inner tube by a central angle (a central angle in a state where the airbag is only deployed and not inflated) of 70 to 180 degrees about the gas generator in the tubular circumferential direction are coupled to each other by a coupling portion extending in the tubular length direction.

In the second aspect, description of the inner tube starts from the second inner tube, and a first inner tube is not recited. However, the second aspect does not exclude the provision of the first inner tube in an inner side of the second inner tube (i.e. the airbag may include the first inner tube).

(3) According to a third aspect of the present invention, there is provided an airbag apparatus including a gas generator and an airbag, wherein the airbag includes a first fabric inner tube, a second fabric inner tube and a third fabric inner tube, all surrounding at least a gas injecting portion of the gas generator to have a triple tubular shape from inside to outside in this order, wherein common portions of the first inner tube, the second inner tube and the third inner tube in a tubular circumferential direction are coupled to an airbag main body by a coupling portion extending in a tubular length direction, and wherein other common portions which are separated from the common portions of the first inner tube, the second inner tube and the third inner tube by a central angle (a central angle in a state where the airbag is only deployed and not inflated) of 70 to 180 degrees about the gas generator in the tubular circumferential direction are coupled to each other by a coupling portion extending in the tubular length direction.

In the above airbag apparatus, the third inner tube may be formed by one piece of cloth which is integrally continuous with a longitudinal partition portion which partitions an inflation space of the airbag main body into a front part and a rear part.

In the above airbag apparatus, a first tubular check valve is formed by one piece of cloth which is integrally continuous from the third inner tube.

In the above airbag apparatus, a part of the first check valve in the tubular circumferential direction is coupled to the airbag main body.

In the above airbag apparatus, a second fabric tubular check valve is provided outside of the first valve to have a double tubular shape.

In the above airbag apparatus, common portions of the first check valve and the second check valve in the tubular circumferential direction are coupled to the airbag main body.

In the above airbag apparatus, the second check valve is formed by one piece of cloth which is integrally continuous from a lateral partition portion which partitions the inflation space of the airbag main body into an upper part and a lower part.

In the above airbag apparatus, the first inner tube is shorter than the second inner tube.

In the above airbag apparatus, the first inner tube is formed by one piece of cloth folded into a plurality of layers.

In the above airbag apparatus, the first inner tube and the second inner tube are coupled to each other by a coupling portion extending in the tubular circumferential direction.

In the above airbag apparatus, the second inner tube and the third inner tube are coupled to each other by a coupling portion extending in the tubular circumferential direction.

In the above airbag apparatus, the first inner tube, the second inner tube and the third inner tube are coupled to each other by a coupling portion extending in the tubular circumferential direction.

In the above airbag apparatus, the airbag is a side airbag which is deployed and inflated at a side of an occupant seated on a vehicle seat.

In the above configuration, the common portions of the inner tubes having the double tubular shape or the triple tubular shape in the tubular circumferential direction are coupled to the airbag main body by the coupling portion extending in the tubular length direction, and other common portions which are separated from the common portions of the inner tubes having the double tubular shape or the triple tubular shape by a central angle of 70 to 180 degrees about the gas generator in the tubular circumferential direction are coupled to each other by the coupling portion extending in the tubular length direction. Therefore, the inner tubes having the double tubular shape or the triple tubular shape are constrained with each other and are less likely to deform separately, and the gas flow is also less likely to vary. Therefore, the rectification will be stabilized. Further, since the inner tubes having the double tubular shape or the triple tubular shape are coupled to each other by the coupling portion extending in the tubular circumferential direction, the effect is further improved. Further, since the inner tube having the double tubular shape or the triple tubular shape has higher thermal insulation effect, the effect of protecting the airbag from the high-temperature gas is also improved.

According to the above-described airbag apparatus, the effect of protecting the airbag from high-temperature gas and the effect of rectifying the high-temperature gas can be improved by the inner tube.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 1A is a side view of a vehicle seat to which a side airbag apparatus according to an embodiment is attached, and FIG. 1B is a front view of the vehicle seat;

FIG. 7 is a development view of constituent members of the airbag, wherein Section (a) shows an airbag main body, Section (b) shows a lateral partition portion, Section (c)

Figure 2A:
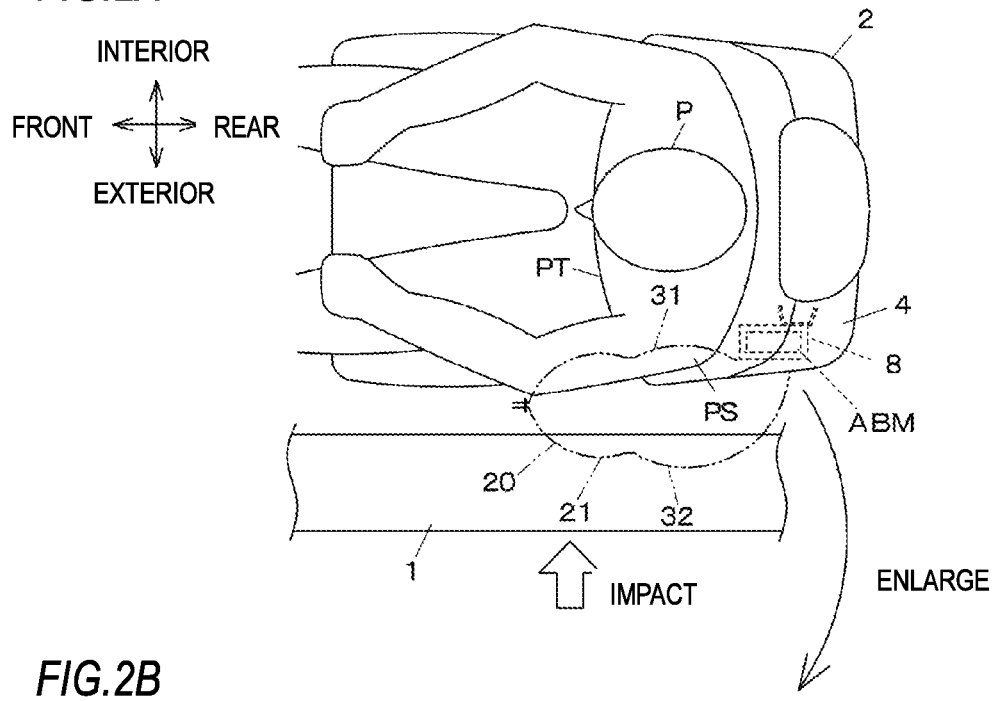
FIG. 2A is a plan view of the vehicle seat.

shows a longitudinal partition portion, Section (d) shows a second inner tube, and Section (e) shows a first inner tube.

DETAILED DESCRIPTION OF THE INVENTION

Hereinafter, a side airbag apparatus for a vehicle according to an embodiment will be described in detail with reference to FIGS. 1A to 7.

In the following description, a forward direction of a vehicle is defined as a front side, and a rearward direction of the vehicle is defined as a rear side. With reference to a central portion in a width direction of the vehicle (a vehicle width direction), a side approaching the central portion is defined as a "vehicle interior side", and a side away from the central portion is defined as a "vehicle exterior side". It is assumed that an occupant having physique same as that of a dummy for a crash test is seated on a vehicle seat. The dummy is, for example, an AM 50 (a model which covers 50% of American adult male) of World Side Impact Dummy (WorldSID).

<Configuration>

As shown in FIGS. 1A to 2B, a vehicle seat 2 is arranged in the vicinity of the vehicle interior side of a body side portion 1 of a vehicle. The body side portion 1 refers to side constituent members of a vehicle body, such as a side door, a side wall, a pillar, or the like. The vehicle seat 2 is arranged in a vehicle interior with a seat back 4 facing forward. A metal side frame portion 5 which is a part of a seat frame is arranged in a side portion of the vehicle exterior side of the seat back 4. A seat pad 6 made of an elastic material such as urethane foam is arranged at a front side of the seat frame including the side frame portion 5 and is covered with a skin (not shown).

In the seat pad 6, a storage portion 8 is provided in the vicinity of the vehicle exterior side of the side frame portion 5. An airbag module ABM forming a main part of the side airbag apparatus is stored in the storage portion 8. A slit 9 extends obliquely forward and towards the vehicle exterior side from a corner portion of the storage portion 8. A portion (surrounded by a two-dot chain line in FIG. 2B) interposed between a corner portion 6c at a front side of the seat pad 6 and the slit 9 configures a breakage expected portion 7 to be broken by an airbag 20 described later. The airbag module ABM includes the gas generator 10 and the airbag 20 as main constituent members.

The gas generator 10 includes an inflator 11, and a retainer 12 which covers the inflator 11.

The inflator 11 has a substantially cylindrical shape and includes a gas injecting portion 11a on a lower end portion thereof. A wire harness (not shown) serving as a wiring for inputting an actuation signal to the inflator 11 is connected to an upper end portion of the inflator 11. The inflator 11 may be a pyro-type inflator (a gas generating agent (not shown) for generating inflation gas is accommodated), a hybrid-type inflator (a partition wall of a high pressure gas cylinder is broken by explosive powder or the like, and the inflation gas is injected from the same cylinder), or the like.

The retainer 12 is a member which functions as a diffuser for controlling a direction in which the inflation gas is injected and has a function of fastening the inflator 11 together with the airbag 20 to the side frame portion 5. A major part of the retainer 12 is formed into a substantially tubular shape by bending a plate material, such as a metal plate. A bolt 13 fixed to the retainer 12 is inserted through the side frame portion 5 and fastened by a nut 14, so that the retainer 12 is attached to the side frame portion 5. Incidentally, the gas generator 10 may be a gas generator in which the inflator 11 and the retainer 12 are integrated.

As shown in FIGS. 3 to 6B, the airbag 20 is configured by coupling the following members by coupling portions a1 to a11:

an airbag main body 21;
a lateral partition portion 23 (added with a second check valve 28);
a longitudinal partition portion 22 (added with a third inner tube 24 and a first check valve 27);
a second inner tube 25; and
a first inner tube 26.

FIG. 7 is a development view before each member is folded in half.

A material of the members 21 to 28 is a material having high strength and flexibility so as to be easily foldable. For example, a woven fabric (used in the present embodiment) formed by using a polyester yarn, a polyamide yarn or the like may be suitable. Sewing with yarns (the present embodiment adopts the sewing with yarns), adhesion with an adhesive, or the like are suitable for coupling of the coupling portions a1 to a11.

The airbag main body 21 configures an outer shell portion. The airbag main body 21 is formed into a bag shape to have an inflation space therein, wherein one piece of large oblong cloth is folded in half along an upper-lower fold line 30 which is in the middle of the cloth and becomes a rear side such that a body cloth portion 31 positioned at the vehicle interior side and a body cloth portion 32 positioned at the vehicle exterior side are overlapped in a vehicle width direction, and non-continuous peripheral edge portions are coupled by a peripheral edge upper coupling portion a1, a peripheral edge lower coupling portion a2, an enclosure upper coupling portion a3 enclosing a terminal portion of the peripheral edge upper coupling portion a1, and an enclosure lower coupling portion a4 enclosing a terminal portion of the peripheral edge lower coupling portion a2.

Each of the body cloth portions 31, 32 is formed into a shape and a size capable of occupying a region corresponding to a major part (from a waist PP to a shoulder PS) of an upper body of an occupant P when the airbag main body 21 is deployed and inflated between the vehicle seat 2 and the body side portion 1.

An insertion opening 33 for the gas generator 10 is opened at a rear end upper portion of the airbag main body 21. An exhaust hole 34 is provided by not coupling the peripheral edge portion between the enclosure upper coupling portion a3 and the enclosure lower coupling portion a4 at a front end lower portion of the airbag main body 21. The exhaust hole 34 is configured to discharge the inflation gas from a front end lower portion of a lower inflation chamber (described later).

The lateral partition portion 23 is used to connect (tether) intermediate portions of the body cloth portions 31, 32 in an upper-lower direction so as to partition the inflation space into a lower inflation chamber 101 and an upper inflation chamber at an upper side of the lower inflation chamber 101. The lower inflation chamber 101 is deployed and inflated at a side of the waist PP of the upper body of the occupant P. The upper inflation chamber will be described later.

The lateral partition portion 23 is arranged in the body cloth portions 31, 32 at a state where another one piece of oblong belt-shaped cloth is folded in half along an upper-lower fold line 36 which is in the middle of the cloth and becomes a rear side, so as to configure a constituent cloth portion 37 positioned at the vehicle interior side and extending from a rear end portion to a front end portion of the body cloth portion 31, and a constituent cloth portion 38 positioned at the vehicle exterior side and extending from a rear end portion to a front end portion of the body cloth portion 32, and the fold line 30 is aligned with the fold line 36.

The constituent cloth portions 37, 38 are respectively coupled to the body cloth portions 31, 32 by an outer coupling portion a5 provided along the upper peripheral edge portions thereof, and the constituent cloth portions 37, 38 are coupled to each other by an inner coupling portion a6 provided along the lower peripheral edge portions thereof, so that the lateral partition portion 23 is connected to both body cloth portions 31, 32. Further, front end portions of the constituent cloth portions 37, 38 are coupled (sewed together) to front end portions of the body cloth portions 31, 32 by a part of the peripheral edge upper coupling portion a1.

An extension portion 39 extending forward and downward is added and formed by one piece of cloth which is integrally continuous from a rear lower portion of the constituent cloth portion 37 at the vehicle interior side. An extension portion 40 extending forward and downward is added and formed by one piece of cloth which is integrally continuous from a rear lower portion of the constituent cloth portion 38 at the vehicle exterior side. Rear ends of both extension portions 39, 40 are continuous and folded in half along the fold line 36. Rear portions of both extension portions 39, 40 are respectively coupled (sewed together) to the body cloth portions 31, 32 by a part of the peripheral edge lower coupling portion a2 extending forward and downward. Front portions of both extension portions 39, 40 are coupled to each other by a part of the inner coupling portion a6 extending forward and downward. A lower end between both extension portions 39, 40 is opened, so that a second tubular check valve 28 extending forward and downward is configured by both extension portions 39, 40.

The longitudinal partition portion 22 is used to connect (tether) intermediate portions of both body cloth portions 31, 32 in the front-rear direction so as to partition the upper inflation chamber into an upper-rear inflation chamber 103 and an upper-front inflation chamber 102 at a front side of the upper-rear inflation chamber 103. The upper-rear inflation chamber 103 is deployed and inflated at a side of a rear half of a chest PT and a side of the shoulder PS of the upper body of the occupant P. The upper-front inflation chamber 102 is deployed and inflated at a side of a front half of the chest PT of the upper body of the occupant P.

The longitudinal partition portion 22 is formed integrally with the third inner tube 24 and extension portions 43, 44, by another one piece of cloth. That is, one piece of rectangular cloth with a corner (ear portion) is folded in half along an upper-lower fold line 42 which is in the middle of the cloth and becomes a rear side so as to integrally form the third inner tube 24 at the center, an extension portion 45 at the vehicle interior side and an extension portion 46 at the vehicle exterior side which extend downward from a lower end of the third inner tube 24, a cloth portion 43 at a front side of the third inner tube 24 extending from an upper end portion of the body cloth portion 31 to an intermediate portion in the upper-lower direction in a belt shape and positioned at the vehicle interior side, and a cloth portion 44 at the front side of the third inner tube 24 extending from an upper end portion of the body cloth portion 32 to the intermediate portion in the upper-lower direction in a belt shape and positioned at the vehicle exterior side. The cloth piece is arranged in the body cloth portions 31, 32 and the lateral partition portion 23 at a state where the fold line 42 is aligned with the fold lines 30, 36.

The cloth portions 43, 44 are (a) respectively coupled to the constituent cloth portions 37, 38 by a front-lower coupling portion a7 provided along a front peripheral edge portion thereof and are (b) respectively coupled to the body cloth portions 31, 32 by a front-upper coupling portion a8 provided along the front peripheral edge portion thereof Further, both cloth portions 43, 44 are (i) coupled to each other by a longitudinal coupling portion a9 provided along a rear upper portion thereof are (ii) coupled to each other (together with the first inner tube 26 and the second inner tube 25) by a lower portion of the longitudinal coupling portion a9 provided along a boundary portion between the cloth portions 43, 44 and the third inner tube 24, and (iii) lower portions thereof are coupled to each other (together with the constituent cloth portions 37, 38) by a part of the inner coupling portion a6. Accordingly, the longitudinal partition portion 22 is connected to both body cloth portions 31, 32.

The longitudinal partition portion 22 is formed with communicating portions 47 allowing communication between the upper-rear inflation chamber 103 and the upper-front inflation chamber 102. In the present embodiment, the communicating portions 47 are configured by round holes formed in the cloth portions 43, 44.

Rear ends of the extension portions 45, 46 are continuous and folded in half along the fold line 42. Rear portions of both extension portions 45, 46 are respectively coupled (sewed together) to the body cloth portions 31, 32 (together with the extension portions 39, 40) by a part of the peripheral edge lower coupling portion a2 extending forward and downward, front portions of both extension portions 45, 46 are coupled to each other (together with the extension portions 39, 40) by a part of the inner coupling portion a6 extending forward and downward, and a lower end between both extension portions 45, 46 is opened, so that the first tubular check valve 27 extending forward and downward is configured by both extension portions 45, 46.

The third inner tube 24 is folded along the fold line 42 and rounded to have a tubular shape which surrounds substantially the entire length of the inflator 11 excluding an upper end portion thereof beyond a lower end thereof.

The second inner tube 25 is configured by folding and rounding another one piece of rectangular cloth along an upper-lower fold line 48 which is in the middle of the cloth and becomes a rear side to have a tubular shape which surrounds a region lower than the inflator 11 and a major part of the inflator 11 excluding the upper end portion thereof. The second inner tube 25 is arranged in the third inner tube 24 at a state where the fold line 48 is aligned with the fold lines 30, 36, and 42.

Another one piece of rectangular cloth is folded a plurality of times to form a multilayer cloth. The first inner tube 26 is configured by folding and rounding the multilayer cloth (the multilayer cloths is represented by bold lines in FIGS. 2, 4 and 5) along an upper-lower fold line 50 which is in the middle of the cloth and becomes a rear side to have a tubular shape (shorter than the second inner tube 25) which surrounds the gas injecting portion 11a of the inflator 11 and the vicinity thereof. The first inner tube 26 is arranged in the second inner tube 25 at a state where the fold line 50 is aligned with the fold lines 30, 36, 42 and 48.

Figure 3:
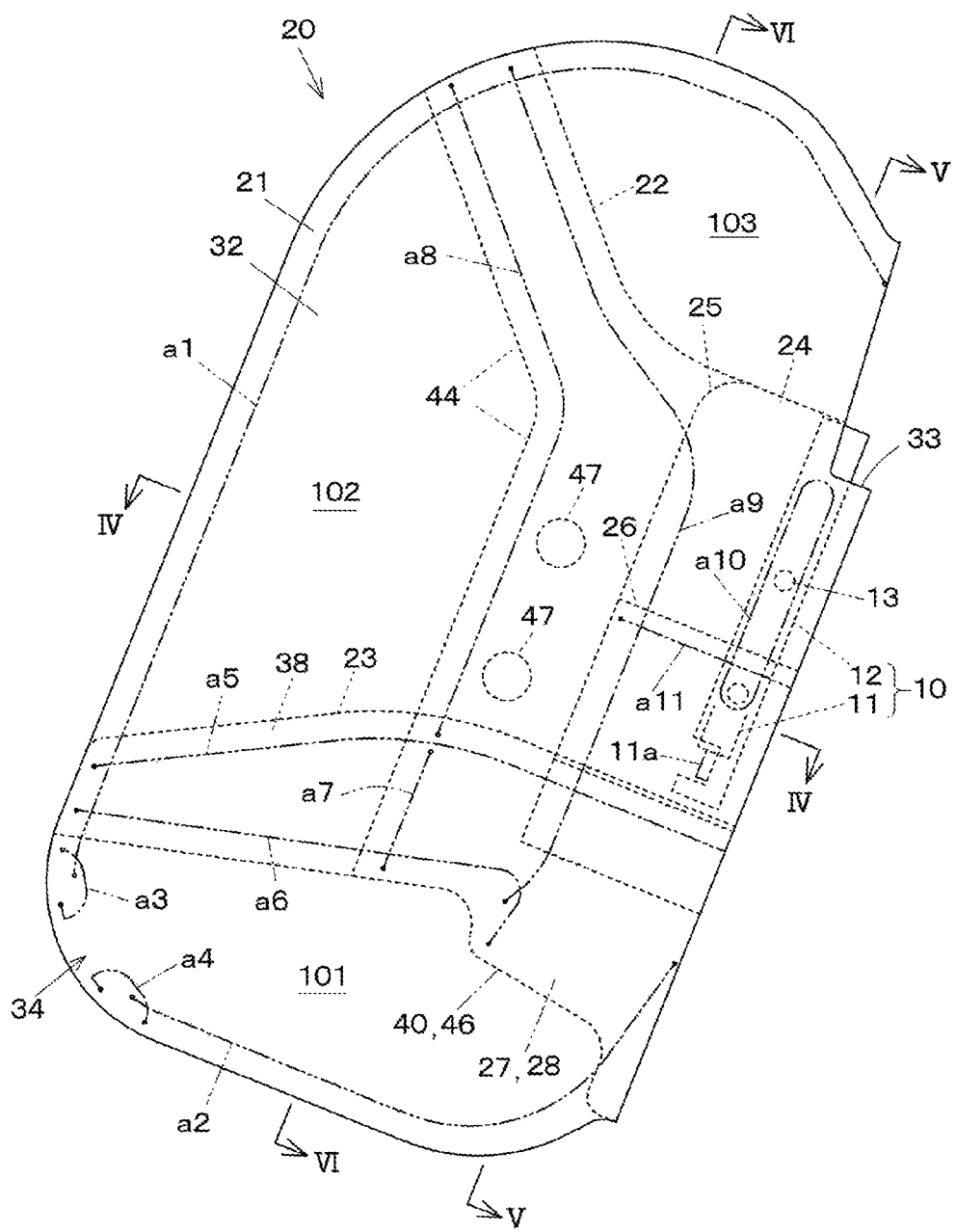
FIG. 3 is a side view of an airbag of the side airbag apparatus.

As shown in FIGS. 3, 4 and 5, the first inner tube 26, the second inner tube 25, and the third inner tube 24 have a triple tubular shape with inside, middle and outside tubulars while the third inner tube 24 and the second inner tube 25 have a double tubular shape without the first inner tube 26 at portions above and lower than the first inner tube 26.

Common portions of the inner tubes 26, 25 and 24 having the triple tubular shape in a tubular circumferential direction are coupled to the airbag main body 21 by a body coupling portion a10. The body coupling portion a10 is also used for reinforcing the cloth around the bolt 13 and has a loop shape (see FIG. 3) including two coupling portions extending in a tubular length direction with the bolt 3 interposed therebetween.

Figure 2B:
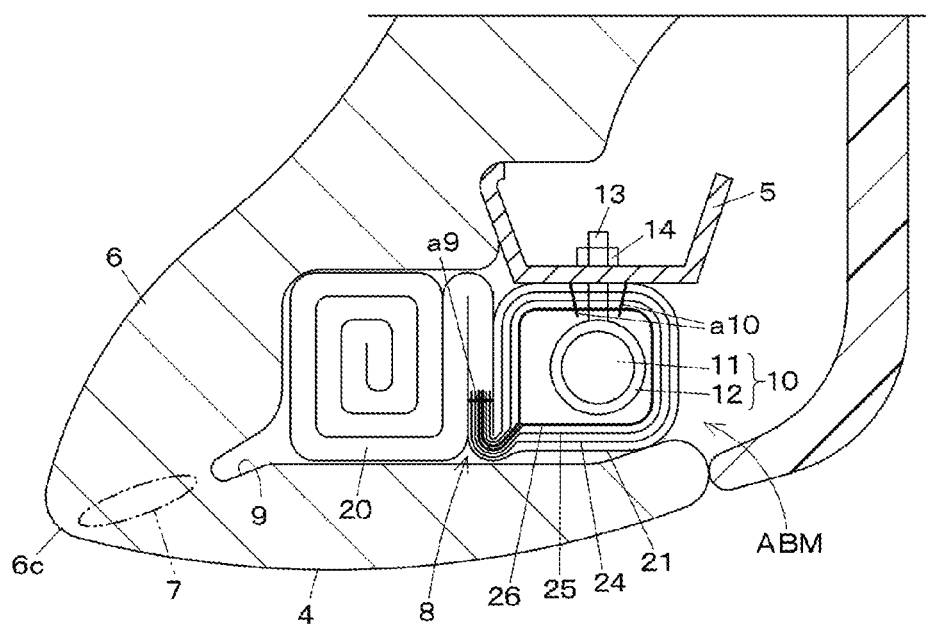
FIG. 2B is an enlarged sectional view of the vicinity of the side airbag apparatus.
Figure 4A:
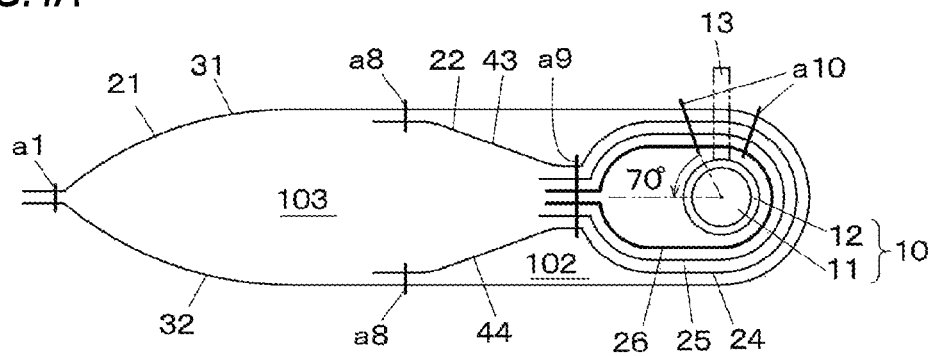
FIG. 4A is a sectional view taken along a line IV-IV of FIG. 3 showing a state where the airbag is only deployed and not inflated.
Figure 4B:
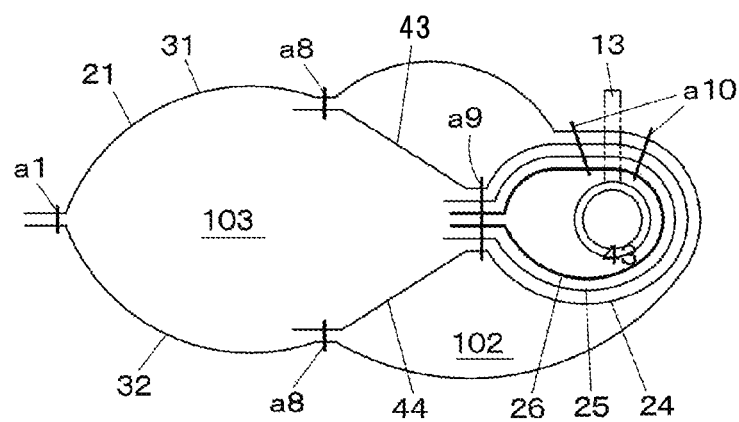
FIG. 4B is a sectional view taken along the line IV-IV of FIG. 3 showing a state where the airbag is deployed and inflated.
Figure 4C:
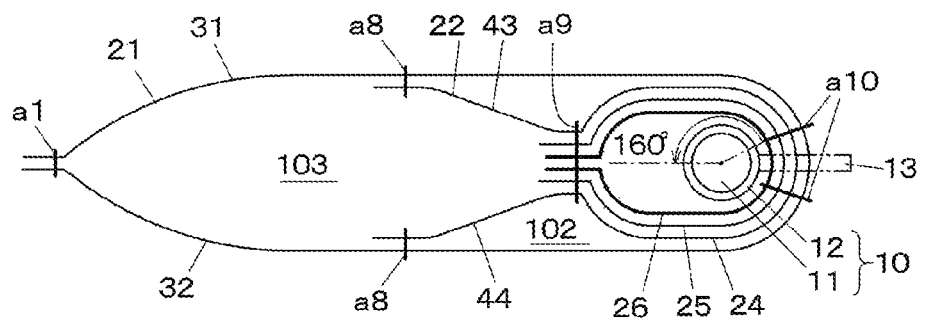
FIG. 4C is a sectional view taken along the line IV-IV of FIG. 3 showing an example in which positions of a bolt and a coupling portion in FIG. 4A are changed.

Other portions at a front side of the inner tubes 26, 25 and 24 having the triple tubular shape, which are separated from any one (herein, one closer to the other portions) of the two body coupling portions a10 by a central angle (a central angle in a state where the airbag 20 is only deployed and not inflated) of 70 to 180 degrees about the inflator 11 in the tubular circumferential direction are coupled to each other by a lower portion of the longitudinal coupling portion a9 extending in the tubular length direction. Specifically, as shown in FIGS. 2B, 3 and 4A, the central angle is, for example 70 to 90 degrees (70 degrees in the example of the figure) in a case where the bolt 13 is located at a side portion of the retainer 12. Further, as shown in FIG. 4C, the central angle is, for example 160 to 180 degrees (160 degrees in the example of the figure) in a case where the bolt 13 is located at a rear portion of the retainer 12. Furthermore, the central angle is for example 90 to 160 degrees (not shown) in a case where the bolt 13 is located at an intermediate portion between the position shown in FIG. 4A and the position shown in FIG. 4C.

As shown in FIG. 3, the first inner tube 26, the second inner tube 25 and the third inner tube 24 are coupled to each other by a tubular circumferential coupling portion a11 extending in the tubular circumferential direction.

As described above, the airbag 20 includes the first fabric inner tube 26, the second fabric inner tube 25 and the third fabric inner tube 24 which surround at least the gas injecting portion 11a of the air generator 10 to have the triple tubular shape with inside, middle and outside tubulars. The common portions of the first inner tube 26, the second inner tube 25 and the third inner tube 24 in the tubular circumferential direction are coupled to the airbag main body 21, and the other common portions which are separated in the tubular circumferential direction from the common portion of the first inner tube 26, the second inner tube 25 and the third inner tube 24 are coupled to each other.

The second fabric tubular check valve 28 is provided outside of the first fabric tubular check valve 27 to have the double tubular shape.

<Operational Effect>

Figure 5A:
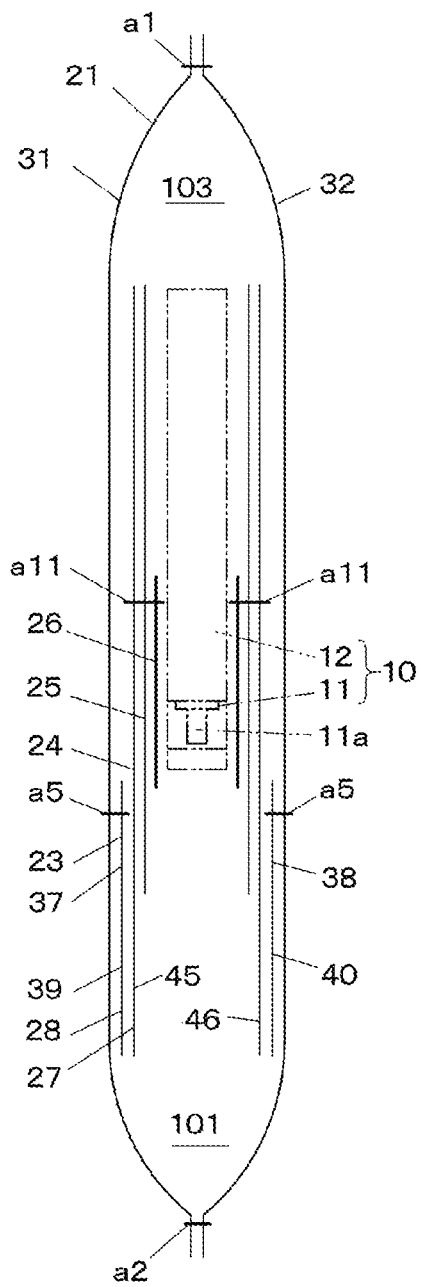
FIG. 5A is a sectional view taken along a line V-V of FIG. 3 showing a state where the airbag is only deployed and not inflated.
Figure 5B:
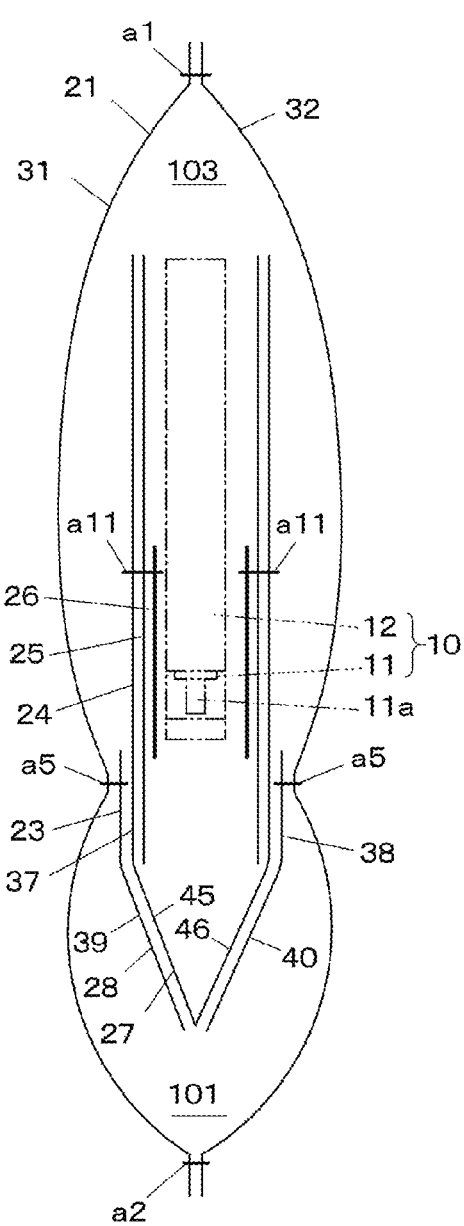
FIG. 5B is a sectional view taken along the line V-V of FIG. 3 showing a state where the airbag is deployed and inflated.
Figure 6A:
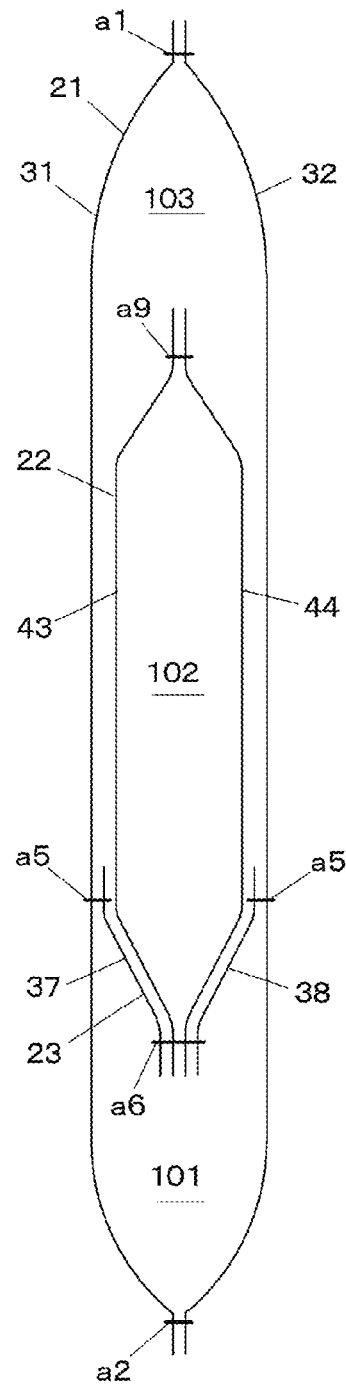
FIG. 6A is a sectional view taken along a line VI-VI of FIG. 3 showing a state where the airbag is only deployed and not inflated.
Figure 6B:
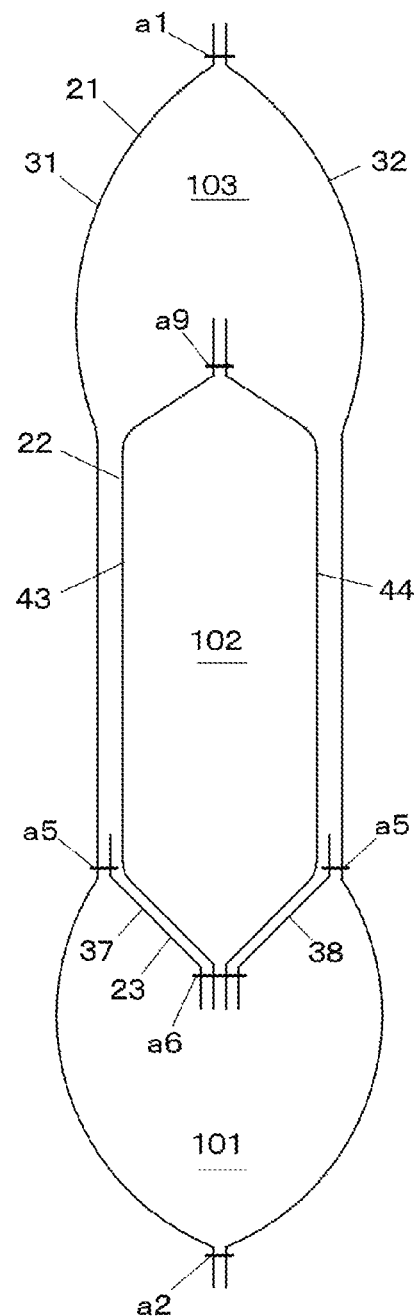
FIG. 6B is a sectional view taken along the line VI-VI of FIG. 3 showing a state where the airbag is deployed and inflated.

Next, the effect of the side airbag apparatus configured above will be described. FIGS. 4A, 5A and 6A show a state where the airbag main body 21 is only deployed and not inflated. FIGS. 4B, 5B and 6B show a state where the airbag main body 20 is deployed and inflated.

When an impact whose magnitude is equal to or more than a predetermined value is applied to the body side portion 1 due to vehicle side collision or the like and is detected by an impact sensor 111, an actuation signal for actuating the gas generator 10 is output to the gas generator 10 from a controller 112 based on the detection signal. In response to the actuation signal, the inflation gas is injected from the gas injection portion of the inflator 11. The injected inflation gas is distributed upward and downward by the first inner tube 26, the second inner tube 25 and the third inner tube 24. The amount of the inflation gas distributed downward is more than that of the inflation gas distributed upward.

The inflation gas distributed upward is supplied to the upper-rear inflation chamber 103 from an upper end of the second inner tube 25 and the third inner tube 24. The inflation gas raises internal pressure of the upper-rear inflation chamber 103, so that the upper-rear inflation chamber 103 starts to inflate.

The inflation gas distributed downward is supplied to the first check valve 27 and the second check valve 28 from a lower end of the second inner tube 25 and the third inner tube 24. During a period in which the inflation gas is supplied to the check valves 27 and 28, force is applied which causes the extension portions 45, 46 and the extension portions 39, 40, which are valve bodies, to form into the tubular shape. As shown in FIG. 5A, the check valve 27 and the second check valve 28 are opened by the force. Therefore, the inflation gas flows into the lower inflation chamber 101 through the extension portions 45, 46. The inflation gas raises internal pressure of the lower inflation chamber 101, so that the lower inflation chamber 101 starts to inflate.

By continuously supplying the inflation gas from the gas generator 10, the internal pressure of the upper-rear inflation chamber 103 and the lower inflation chamber 101 rise. However, since the amount of the inflation gas supplied to the lower inflation chamber 101 is more than that of the inflation gas supplied to the upper-rear inflation chamber 103, the internal pressure of the lower inflation chamber 101 becomes higher than that of the upper-rear inflation chamber 103.

In the upper inflation chamber, as the expansion of the upper-rear inflation chamber 103, a part of the inflation gas in the upper-rear inflation chamber 103 flows into the upper-front inflation chamber 102 through the communicating portions 47, and the upper-front inflation chamber 102 starts to inflate later than the upper-rear inflation chamber 103.

The seat pad 6 of the seat back 4 is pressed by the deployed and inflated airbag 20 and broken at the breakage expected portion 7. The airbag main body 21 gets out forward from the seat back 4 through the broken portion while a part of the airbag main body 21 remains in the storage portion 8.

The inflation gas is kept to be supplied, and the lower inflation chamber 101 having the highest internal pressure is deployed and inflated at a side of the waist PP with the highest impact resistance among the side portions of the upper body of the occupant P. The upper-rear inflation chamber 103 whose internal pressure becomes higher later than the lower inflation chamber 101 is deployed and inflated at a side of the shoulder PS and a side of the rear half of the chest PT whose impact resistance is higher than that of the front half of the chest PT. The upper-front inflation chamber 102 having internal pressure lower than that of the upper-rear inflation chamber 103 is deployed and inflated at a side of the front half of the chest PT whose impact resistance is lower than that of the shoulder PS or the rear half of the chest PT. In this manner, the waist PP, the shoulder PS and the chest PT are protected from the impact.

In the present embodiment, the common portions of the inner tubes 26, 25 and 24 having the triple tubular shape in the tubular circumferential direction are coupled to the airbag main body 21 by the body coupling portion a10 extending in the tubular length direction, and the other common portions which are separated from the common portions of the inner tubes 26, 25 and 24 having the triple tubular shape by a central angle of 70 to 180 degrees about the inflator 11 in the tubular circumferential direction are coupled to each other by the longitudinal coupling portion a9 extending in the tubular length direction. Therefore, the inner tubes 26, 25 and 24 having the triple tubular-shape are constrained with each other and less likely to deform separately, the gas flow is also less likely to vary, and the rectification is stabilized accordingly. According to the present embodiment, since the inner tubes 26, 25 and 24 having the triple tubular-shape are coupled to each other by the tubular circumferential coupling portion a11 extending in the tubular circumferential direction, the effect is further improved. Further, since the thermal insulation effect is enhanced by the inner tubes 26, 25 and 24 having the triple tubular-shape, the effect of protecting the airbag from the high-temperature gas is also improved.

Further, the above embodiment can also be implemented as a modified example with modifications as follows.

(1) Any one of the first inner tube 26, the second inner tube 25 and the third inner tube 24 may be omitted, so that the second inner tube 25 and the third inner tube 24 may have a double tubular shape, the first inner tube 26 and the third inner tube 24 may have a double tubular shape, or the first inner tube 26 and the second inner tube 25 may have a double tubular shape.

(2) Any one or more of the airbag main body 21, the lateral partition portion 23, the first inner tube 26, the second inner tube 25 and the third inner tube 24 may be configured by two pieces of cloth divided along the respective fold line. In this case, the peripheral edge portions of the two pieces of divided cloth may be coupled.

(3) The inventive concept of the present invention can also be applied to an airbag apparatus (for example, a driver airbag, a passenger airbag, a curtain shield airbag, a door mounted curtain airbag, a knee airbag, a seat cushion airbag, a rear seat airbag, a rear seat center airbag or the like) as well as the side airbag apparatus.

(4) The configuration according to an embodiment of the present invention may also be applied to an airbag apparatus provided to other kinds of vehicle (for example, an aircraft, a ship or the like).

What is claimed is:

1. An airbag apparatus comprising:
a gas generator; and
an airbag,
wherein the airbag includes a second fabric inner tube and a third fabric inner tube, both surrounding at least a gas injecting portion of the gas generator to have a double tubular-shape, the second inner tube and the third inner tube being arranged from inside to outside in this order,
wherein common portions of the second inner tube and the third inner tube in a tubular circumferential direction are coupled to an airbag main body by a body coupling portion extending in a tubular length direction, and
wherein other common portions of the second inner tube and the third inner tube are coupled to each other by a longitudinal coupling portion extending in the tubular length direction, in a state where the airbag is only deployed and not inflated a first imaginary line through the other common portions at the longitudinal coupling portion and a second imaginary line through the common portions of the second inner tube and the third inner tube at the body coupling portion are separated in the tubular circumferential direction by a central angle of 70 to 180 degrees about the gas generator,
wherein a first tubular check valve is formed by one piece of cloth which is integrally continuous from the third inner tube,
wherein a part of the first check valve in the tubular circumferential direction is coupled to the airbag main body.

2. The airbag apparatus according to claim 1,
wherein the third inner tube is formed by one piece of cloth which is integrally continuous with a longitudinal partition portion which partitions an inflation space of the airbag main body into front part and rear part.

3. An airbag apparatus comprising:
a gas generator; and
an airbag,
wherein the airbag includes a second fabric inner tube and a third fabric inner tube, both surrounding at least a gas injecting portion of the gas generator to have a double tubular-shape, the second inner tube and the third inner tube being arranged from inside to outside in this order,
wherein common portions of the second inner tube and the third inner tube in a tubular circumferential direction are coupled to an airbag main body by a body coupling portion extending in a tubular length direction, and
wherein other common portions of the second inner tube and the third inner tube are coupled to each other by a longitudinal coupling portion extending in the tubular length direction, in a state where the airbag is only deployed and not inflated a first imaginary line through the other common portions at the longitudinal coupling portion and a second imaginary line through the common portions of the second inner tube and the third inner tube at the body coupling portion are separated in the tubular circumferential direction by a central angle of 70 to 180 degrees about the gas generator,
wherein a first tubular check valve is formed by one piece of cloth which is integrally continuous from the third inner tube,
wherein a second fabric tubular check valve is provided outside of the first valve to have a double tubular shape.

4. The airbag apparatus according to claim 3,
wherein common portions of the first check valve and the second check valve in the tubular circumferential direction are coupled to the airbag main body.

5. The airbag apparatus according to claim 3,
wherein the second check valve is formed by one piece of cloth which is integrally continuous from a lateral partition portion which partitions an inflation space of the airbag main body into an upper part and a lower part.

6. The airbag apparatus according to claim 3,
wherein the third inner tube is formed by one piece of cloth which is integrally continuous with a longitudinal partition portion which partitions an inflation space of the airbag main body into front part and rear part.

7. An airbag apparatus comprising:
a gas generator; and
an airbag,
wherein the airbag includes a first fabric inner tube, a second fabric inner tube and a third fabric inner tube, all surrounding at least a gas injecting portion of the gas generator to have a triple tubular-shape, the first inner tube, the second inner tube, and the third inner tube being arranged from inside to outside in this order,
wherein common portions of the first inner tube, the second inner tube and the third inner tube in a tubular circumferential direction are coupled to an airbag main body by a body coupling portion extending in a tubular length direction, and wherein other common portions of the first inner tube, the second inner tube, and the third inner tube are coupled to each other by a longitudinal coupling portion extending in the tubular length direction, in a state where the airbag is only deployed and not inflated a first imaginary line through the other common portions at the longitudinal coupling portion and a second imaginary line through the common portions of the first inner tube, the second inner tube and the third inner tube at the body coupling portion are separated in the tubular circumferential direction by a central angle of 70 to 180 degrees about the gas generator, wherein the first inner tube, the second inner tube and the third inner tube are coupled to each other by a tubular circumferential coupling portion extending in the tubular circumferential direction.

8. The airbag apparatus according to claim 7, wherein the third inner tube is formed by one piece of cloth which is integrally continuous with a longitudinal partition portion which partitions an inflation space of the airbag main body into front part and rear part.

9. The airbag apparatus according to claim 7, wherein a first tubular check valve is formed by one piece of cloth which is integrally continuous from the third inner tube.

10. The airbag apparatus according to claim 9, wherein a part of the first check valve in the tubular circumferential direction is coupled to the airbag main body.

11. The airbag apparatus according to claim 9, wherein a second fabric tubular check valve is provided outside of the first check valve to have a double tubular shape.

12. The airbag apparatus according to claim 11, wherein common portions of the first check valve and the second check valve in the tubular circumferential direction are coupled to the airbag main body.

13. The airbag apparatus according to claim 11, wherein the second check valve is formed by one piece of cloth which is integrally continuous from a lateral partition portion which partitions an inflation space of the airbag main body into an upper part and a lower part.

14. The airbag apparatus according to claim 7, wherein the first inner tube is shorter than the second inner tube.

15. The airbag apparatus according to claim 7, wherein the first inner tube is formed by one piece of cloth folded into a plurality of layers.

16. The airbag apparatus according to claim 7, wherein the airbag is a side airbag which is deployed and inflated at a side of an occupant seated on a vehicle seat to which the airbag apparatus is attached.

* * * * *